June 19, 1956  R. W. RUSSELL ET AL  2,750,986
CONTROL APPARATUS FOR STRIPS
Filed March 20, 1953  2 Sheets-Sheet 1
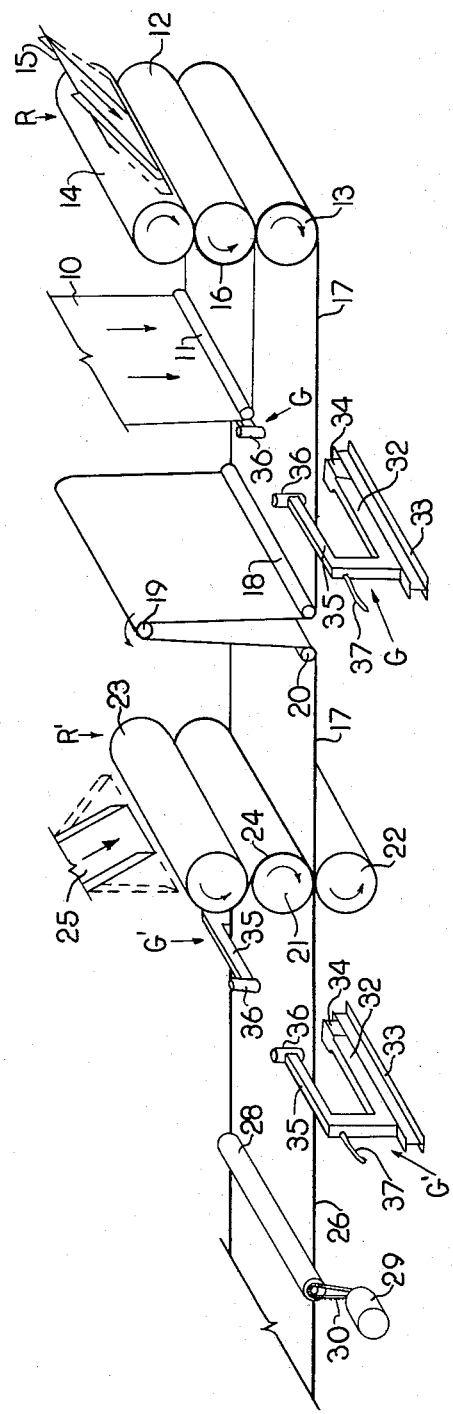
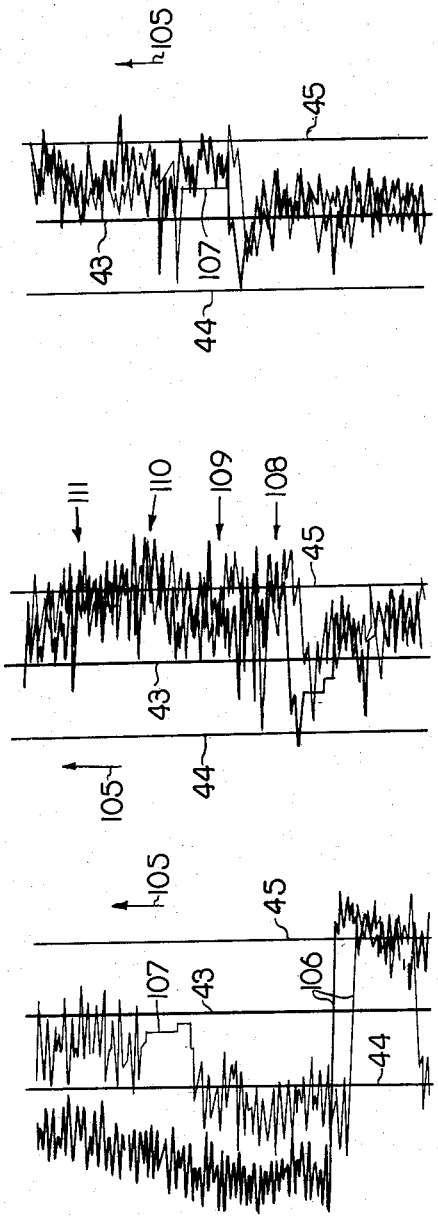
INVENTOR.
ROY W. RUSSELL
ELMER A. STECKEL
BY Horace B. Van Valkenburgh
ATTORNEY June 19, 1956 R. W. RUSSELL ET AL 2,750,986
CONTROL APPARATUS FOR STRIPS
Filed March 20, 1953 2 Sheets-Sheet 2

INVENTOR.
ROY W. RUSSELL
ELMER A. STECKEL
BY Horace B. Van Valkenburgh
ATTORNEY

United States Patent Office 2,750,986
Patented June 19, 1956

2,750,986

CONTROL APPARATUS FOR STRIPS

Roy W. Russell, Denver, and Elmer A. Steckel, Wheat Ridge, Colo., assignors to The Gates Rubber Company, Denver, Colo., a corporation of Colorado Application March 20, 1953, Serial No. 343,752

2 Claims. (Cl. 154—1)

This invention relates to control apparatus, and more particularly to control apparatus for maintaining within predetermined limits a dimension, such as the thickness, of a strip being produced by rolls or the like. This invention more particularly relates to control apparatus for calender rolls which apply a layer of rubber or the like to a fabric strip and especially to more than one set of calender rolls, wherein a layer of rubber is applied to both sides of the fabric strip in successive roll stands.

In the manufacture of calendered fabric, as for use in making automobile tires, a layer of rubber or the like is applied to one or both sides of a fabric, such as a first layer being applied to one side of the fabric strip and penetrating the fabric, and a second layer later being applied on the opposite side of the fabric. Calendered fabric is usually referred to by its weight per square yard, as a matter of convenience, although the weight per unit area is usually proportional to the thickness. Thus, the fabric has a substantially constant weight per square yard, and the weight per square yard of the applied layers or coats varies in proportion to the thickness of the rubber layer or layers applied to one or both sides of the fabric. In order to achieve an adequate rate of production, the strip is produced at a relatively high rate of speed, such as about 50 to 100 yards per minute, the strip generally travelling at approximately the rate of speed of the lower roll of each calender. With manual control, a variation in the thickness of the layer applied to either or both sides of the fabric is determined by physical measurement, but by the time a correction can be made for a measurement which shows the calendered fabric to be outside of specification limits, either on the thin or thick side, yards of material which will not meet specification will have been produced. Thus, full manual control is impractical for higher speeds, as well as being wasteful even at lower speeds. If control of the thickness of the applied layers automatically is attempted, the rate of speed renders a contact measuring device, such as a pair of rollers, impractical, since very slight variations in thickness, as on the order of 0.0001 inch, are difficult to transmit to control mechanism, as by a lever or linkage arrangement. However, there are certain types of rays which are impeded or arrested by the material, in proportion to its weight or thickness, and which may be utilized in gauging and controlling the thickness of the material. For example, beta rays produced by a radioactive isotope such as strontium 90 upon being directed through the material from a substantially constant source, will be impeded or arrested in proportion to the weight of material, which, as indicated previously, will vary in proportion to the thickness. Thus, the number of beta rays passing through the strip, over a given area, may be detected in an ionization chamber, the control current produced by the ionization chamber being inversely proportional to the absorption of beta rays by the material and the source of beta rays and the ionization chamber may provide a beta ray gauge. Since this value varies in accordance with the thickness, such current may be used to operate control apparatus as well as a recorder, which indicates the exact thickness of the layer of material passing between the radioactive isotope and the ionization chamber, even at relatively high speeds.

Among the objects of the present invention are to provide novel control apparatus; to provide such apparatus which is particularly adapted to be utilized in controlling the thickness of a strip, such as a fabric strip to which a layer or coat of rubber or the like is applied to one or both sides; to provide such apparatus which will operate effectively; to provide such apparatus which will result in a minimum of material outside specification limits; to provide such apparatus which will accommodate differences in the speed at which the strip is run, and differences in specifications for various operations; and to provide such apparatus which is effective and reliable in operation.

Additional objects and the novel features of this invention will become apparent from the description which follows, taken in connection with the accompanying drawings, in which:

Fig. 1 is a generally diagrammatic, perspective view of apparatus for making a calendered fabric, consisting of a central strip of fabric and a layer or coat of gum rubber on each side of a desired thickness, such apparatus being equipped with beta ray gauges in accordance with the present invention;

Fig. 4 is a reproduction of a section of a chart obtained while weight or thickness was controlled manually; and Figs. 5 and 6 are reproductions of sections of charts obtained through use of apparatus constructed in accordance with this invention and illustrating the manner in which weight or thickness control is achieved automatically.

Figure 2:
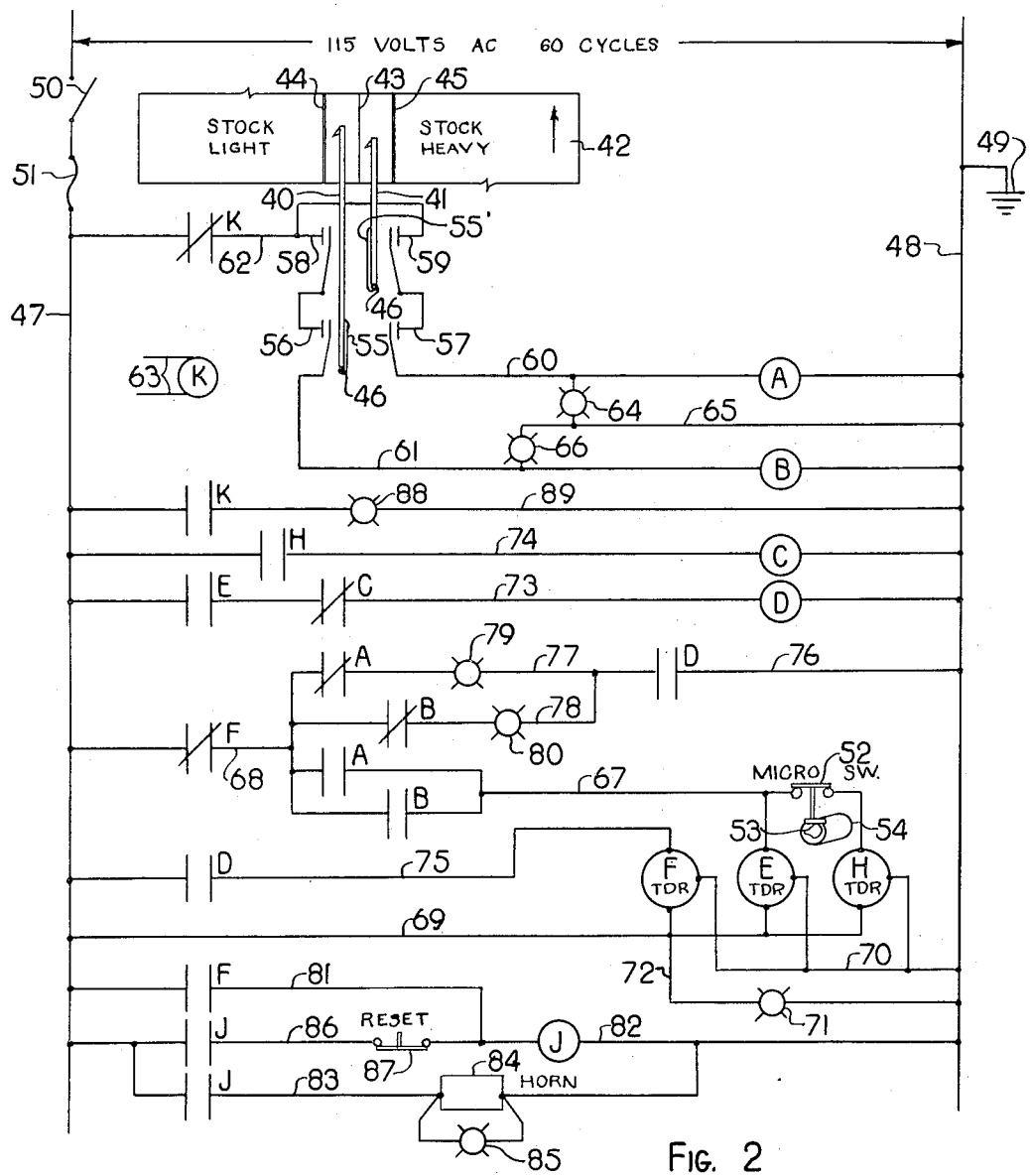
Fig. 2 is a circuit diagram illustrating the connection of electrical parts installed in a panel at a chart recorder and constructed in accordance with this invention.

As illustrated in Fig. 1, the principles of the present invention may be applied to a conventional two calender train for making calendered fabric for use in the manufacture of automobile tires. A strip 10 of fabric, such as approximately 60 inches wide and formed of cords or other suitable material, is fed in the direction of the arrows around a guide roll 11 to and between a center roll 12 and a lower roll 13 of the first roll stand R. Gum rubber or the like is fed, in the direction of the arrow and on the opposite side of roll 12, to the space between center roll 12 and an upper roll 14, by a distributing conveyor 15 which is normally disposed in a central position but may be moved between the dotted positions shown to distribute the gum rubber more evenly along the rubber inlet side of the rolls. The rubber is squeezed between the center roll 12 and the upper roll 14, to produce a rubber layer 16 having a thickness corresponding to the coat which is to be applied to one side of the fabric strip 10, the rubber layer 16 being carried around the center roll and applied to and also penetrating the fabric between the center roll 12 and the lower roll 13, to produce a coated strip 17. The rolls 12, 13 and 14 are rotated in the directions indicated by the arrows. In addition to the drive for the rolls 12, 13 and 14, respectively, not shown because conventional, a conventional adjustment device, also not shown, whereby the vertical relationship between the center line of the upper roll 14 and center roll 12, and also between the lower roll 13 and center roll 12, is provided. The adjustment of the lower roll 13 relative to the center roll 12 may be controlled manually since this adjustment, once set, need not be changed often. However, the adjustment between the upper roll 14 and center roll 12 is preferably controlled automatically, and each adjustment device desirably includes a reversible motor having two speeds, low and high, in each direction.

The coated fabric strip 17, comprising a fabric strip 10 with the rubber layer 16 applied to one side thereof, passes from the underside of the lower roll 13 of the first stand, to and under a guide roll 18, then over a takeup roll 19, which may be operated by a spring or hydraulic actuated mechanism in a conventional manner to maintain a predetermined tension on the strip by regulation of relative speed of the first and second calenders. From the takeup roll 19, the strip 17 may pass under another guide roll 20 and then to the second roll stand R, which includes a center roll 21, a lower roll 22 and an upper roll 23. As will be evident, the coat 16 of rubber applied by the first calender is applied to the side which will be the underside of the fabric strip when it reaches the second calender and a second layer 24 is applied to the top of the fabric strip by the second calender, the layer 24 being produced between the center roll 21 and the roll 23. The layer 24 will be applied to the fabric, as strip 17 and coat 24 pass between rolls 21 and 22.

The second calender rolls are rotated in the direction of the arrows, with suitable adjustment devices for the rolls which may each include a reversible motor having two speeds, as before, the device for adjusting roll 22 being controlled manually and the device for adjusting roll 23 being normally controlled automatically. Rubber for forming the skim coat 24 may be fed to the space between the opposite sides of the rolls 21 and 23 by a conveyor 25 which, as in the case of the conveyor 15, may be normally disposed in a central position but may be moved from side to side, between the dotted positions indicated, in order to insure a more uniform distribution of the rubber. In general, the rubber being pulled between the top roll and center roll of each calender tends to spread out between the rolls, on the feed side, although the distributing conveyors 15 and 25 may also be driven automatically from side to side, if desired. From the second calender, the completed strip 26 or calendered fabric passes to conventional apparatus for winding the strip onto a mandrel, a layer of suitable fabric or the like being wound on the mandrel between layers of the strip, in order to prevent adjacent layers from adhering to each other. The mandrel may then be taken to a desired point of use, such as a cutter for separating the relatively wide strip into narrower strips for use in making tires.

In accordance with this invention, strip 26, after leaving the second stand of rolls, engages a speed indicating roll 28 which drives a selsyn generator 29, as through a chain 30, the selsyn generator 29 producing alternating current whose frequency varies with the rate of travel of strip 26 and which is connected with a selsyn motor for driving a recording chart, as well as a second selsyn motor utilized for a purpose described hereinafter, so that the selsyn motors will rotate at the same speed as the selsyn generator 29. Suitable reduction gearing may be utilized in driving the chart at a particular increment of the speed of the strip 26, such as 1 inch per minute of the chart for 200 ft. per minute of the strip 26.

As also illustrated in Fig. 1, a pair of beta ray gauges G are disposed adjacent the opposite edges of the strip 17, before it reaches the guide roll 18, while a pair of beta ray gauges G' may be disposed adjacent opposite sides of the completed strip 26, between the second calender and the speed indicating roller 28. Preferably, the beta ray gauges G and G' are located relatively close to the calender at which the layer of rubber is applied. Each beta ray gauge G and G' may include a U-shaped frame disposed on its side, with its lower leg 32 slidable along a suitable support, such as a beam 33 and carrying a box 34 in which is disposed the radioactive isotope such as strontium 90. For safety purposes, the box 34 may be provided with a lining of lead or similar beta ray intercepting material and a cover plate of similar material which is adapted to be closed except when the gauges are in action. The upper leg 35 of the U-frame carries at its outer end a housing 36 which encloses an ionization chamber, and the gauges G and G' are connected with cooperating parts of the apparatus of this invention by electrical cables 37. In the ionization chambers in housings 36, the beta rays passing through the strip 17 or 26 are received and produce a current proportional to the number of rays received, the same being inversely proportional to the weight of each square yard or the like of the strip, which, in turn, is approximately proportional to the thickness of the respective strip. Such ionization chambers may operate in a manner similar to the so-called "Geiger" counter, which may comprise a wire anode, usually a fine wire stretched longitudinally along the axis of a hollow metal, cylindrical cathode, both the anode and cathode being enclosed within a glass tube, or the metal cathode itself may be the enclosing tube with suitable insulation for the anode. The tube is evacuated and then filled to a predetermined pressure with a suitable gas or mixture of gases, so that when a beta ray, for instance, which passes through the strip 17 or 26, passes through the wall or cathode of the ionization chamber, it will cause an electron to be liberated. Usually this electron is able to reach the gaseous volume between anode and cathode with sufficient residual energy to produce one or more positive ions and electrons by collision with the gas molecules. These electrons will also produce others by collision during and after acceleration by the electric field within the chamber, and successive multiplications follow in the familiar avalanche process until a large number of electrons have collided with the anode, thereby neutralizing some of its positive charge, which is equivalent to causing a current to pass from the anode to the cathode. This in turn produces a voltage drop which is transmitted through cable 37 to the operating panel. A relatively large number of beta rays will, of course, be passing through the material at any given instant and the total voltage drop produced by the action described above will be proportional to the total number of beta rays passing through the material. The speed of the beta rays is so much in excess of the speed of the strip 17 or 26, which may be moving at a speed of 50 to 100 yds. per minute, as indicated previously, that the resultant voltage is, for practical purposes, a substantially instantaneous indication of the thickness of the strip. The changes in voltage produced by each of the gauges G and G' control, through conventional means, any other desired control or indicating parts, such as the pens 40 and 41 of Fig. 2. These pens 40 and 41 not only indicate the weight (or thickness) of the strip at substantially each instant, as by producing lines on a chart 42, which is driven at a predetermined proportion of the speed of the strip 26 by a selsyn motor, connected in series with the selsyn generator 29, but also may comprise actuating parts for the control apparatus of this invention. On the chart 42, which may move in the direction of the arrow, the central line 43 corresponds to the preferred weight of the strip, while the line 44 indicates the lower tolerance limit and the line 45 the upper tolerance limit. It will be understood, of course, that there are actually two charts, one chart being produced with lines thereon indicating the relative weight of material at each side of strip 17, at the point of passage between the gauges G, and the second chart indicating the relative weight of material at each side of strip 26, at the point of passage between the gauges G'. In general, there may be two control circuits, such as illustrated in Fig. 2, one circuit controlling automatically the adjustment of the distance between the first calender rolls 12 and 14, as a result of the control voltages produced by gauges G, and the second circuit controlling the second calender rolls 21 and 23, as a result of the control voltages produced by the gauges G'.

The gauges G and G' may each be automatically retracted along the beam 33 at spaced time intervals, such as each half-hour with the retraction time for the gauges preferably alternating so that all gauges will not be retracted at once, and each gauge automatically recalibrated during retraction by movement outside the strip 17 or 26, respectively. Thus, any accumulation of dust or the like will be automatically compensated for at each time of retraction. During retraction, the control current to the pen 40 or 41 is shut off, so that the pen will not go off scale during this time. Lines indicating such retraction time are shown in Figs. 4 and 6, which will be described later. In addition, provisions should also be made for optional manual operation of the adjustment devices for the various rolls, if desired, and also whenever the control circuit does not operate properly.

In the control circuit of Fig. 2, the pens 40 and 41 are shown as pivoted at their rear ends on pivots 46, which are connected to suitable equipment, such as operating on the galvanometer principle, to cause the pens to swing to the left or to the right, as the current produced due to the passage of beta rays through the strips 17 or 26 into the respective ionization chambers, increases or decreases. This current is amplified sufficiently, as by a conventional amplifying circuit, so that sufficient torque can be readily produced to swing the pens 40 and 41 from side to side upon appropriate changes in current. As indicated previously, the chart 42 may be driven at a speed corresponding to the speed of the strip 26. Various parts shown in the electrical circuit diagram of Fig. 2 are connected between a hot lead 47 and a ground lead 48, the latter being connected to a ground 49. The current supplied to leads 47 and 48 may be direct current, or 115 volt, 60 cycle A. C., which is usually more readily available. Lead 47 may be provided with an off-on switch 50 and a fuse 51, as indicated, the switch 50 being closed, for automatic operation, after the correct operating setup has been made by the operator. The circuit includes a series of relays A to D, inclusive, adapted to operate simultaneously the respective contacts having identical letters, those normally open having a clear space between the lines indicating the same and those normally closed having a slanting bar across the same. In addition, three time delay relays E, F and H are adapted to operate simultaneously the respective contacts identified by identical letters and being normally open or normally closed, as indicated. Another relay J, adapted to operate simultaneously the normally open contacts identified by the letter J, is utilized in signalling the necessity for temporary manual operation, such as occasioned by a lack of rubber at the feed rolls, as will appear later. In addition, a normally closed microswitch 52 is periodically opened by a cam 53, driven by a selsyn motor 54 controlled by the frequency of the current generated by the selsyn generator 29 of Fig. 1, and preferably has an integral reduction gear arrangement, so as to drive cam 53 at a desired fraction of the speed of the strip 26. The circuit also includes additional parts, connected together as set forth below.

The pen 40, which extends above and beyond the pen 41, may be connected through pivot 46 with a lever 55, which swings with pen 40 and is adapted to close a switch 56 when pen 40 swings to the left beyond line 44 as a result of one side of the strip 17 or 26 becoming lighter than the tolerance limit, and to close a switch 57 when pen 40 swings to the right beyond line 45 as a result of the same side of the strip becoming heavier than the tolerance limit. Similarly, pen 41 may be connected with lever 55' adapted to close a switch 58 when pen 41 swings to the left beyond line 44 as a result of the opposite side of the strip becoming lighter than the tolerance limit, and to close a switch 59 when pen 41 swings to the right beyond line 45 as a result of the same side of the strip becoming heavier than the tolerance limit. It will be understood that levers 55 and 55' are shown only for purposes of illustration of the operation of the circuit, and that the switches 56 to 59, inclusive, may be closed in any suitable manner, as by operation of suitable parts controlled in a manner similar to the pens 40 and 41.

Switches 57 and 59 are placed in series and also in series through a wire 60, with relay A, which is also connected to line 48, while switches 56 and 58 are placed in series and also in series, through a wire 61, with relay B, which is also connected to line 48. The opposite terminals of switches 58 and 59 are also placed in parallel and connected by a line 62, through normally closed contacts K, with line 47. Contacts K are controlled by a relay K, which may be controlled by a suitable amplifying circuit through leads 63, the relay K being responsive to the amplified current produced by the beta ray gauges G or G' and relay K opening the normally closed contacts K whenever the voltage increases above a predetermined value, indicating a thickness of the strip 17 or 26 sufficiently low that the roll stands are probably starved. Thus, if the rubber supply is too low, the normally closed contacts K will open, and the automatic control will become inoperative. As will be evident, as long as contacts K remain closed, whenever switches 57 and 59 are closed at the same time, relay A will be energized, while whenever switches 56 and 58 are similarly closed at the same time, relay B will be energized. Thus, both sides of the strip are required to be heavy or light, respectively, for relay A or B to be energized. It will be understood, of course, that each end of the rolls 14 or 23 of Fig. 1 may be controlled individually, through the respective switches 56 to 59, inclusive, although for the production of calendered fabric for use in the manufacture of tires, simultaneous control of both roll ends has been found to be satisfactory.

When relay A is energized, a lamp 64, which is connected to wire 60 and by a wire 65 with line 48, will be lit, producing a visual indication that a correction of heavy stock is being called for. Similarly, when relay B is energized, a lamp 66 which is connected between wires 61 and 65, will be lit, producing a visual indication that a correction of light stock is being called for. Energization of relay A or B will also start time delay relay E in operation, through closing of the normally open contacts A or B which are connected in parallel and on one side to a wire 67, to which the time delay control terminal of relay E is connected, and on the opposite side to a wire 68 which is connected to line 47 through the normally closed contacts F. One power supply terminal of relay E, and also that of relays F and H, is connected to a wire 69 which leads to line 47, while the other power supply terminal of relay E, and also that of relays F and H, is connected to a wire 70 which leads to line 48. In addition, a lamp 71, which is connected to line 47 and by a wire 72 to wire 70, when lit indicates that power is supplied to relays E, F and H, and, in fact, the entire automatic circuit. Relays E, F and H may be vacuum tube relays of the type known as "G. E. CR7504–A1," which is provided with a potentiometer for adjusting the period of time delay, and connected to reverse the position of the respective contacts indicated by the same letters at the end of the time delay period for which set. Relay E is set for a time delay period, such as 1/10 second, so that control in either direction is possible only if the pens 40 and 41 remain in the correction area longer than for a momentary swing. When time delay relay E reaches the end of its time period, if relay A or B is still energized, it will cause relay D to be energized by closing normally open contacts E placed in series with normally closed contacts C and relay D in a line 73, which extends between power lines 47 and 48. Thus, relay D will be energized unless these normally closed contacts C are open, and will initiate control action in a manner described below.

At the same time that relay E starts its time cycle, relay H may start its time cycle, in the event that microswitch 52 is closed, but relay H may delay start of its time cycle slightly, until micro-switch 52 closes, the latter being dependent upon the position of cam 53. Cam 53 may be proportioned, and the relative speed of the cam chosen, so that micro-switch 52 will be opened every 6.8 to 20 seconds. When relay H reaches the end of its time cycle, such as 1 second, it will cause relay C to be energized, by closing normally open contacts H placed in series with relay C in a line 74, which extends between lines 47 and 48. When relay C is energized, contacts C in line 73 will be opened, thus de-energizing relay D and terminating correction. Relay H thus limits the time period of correction to a maximum of 1 second, and also prevents correction for a length of time, such as 6.8 to 20 seconds, inversely proportional to the speed of the strip. In other words, as long as micro-switch 52 is closed, relay H will cause contacts C in line 73 to open at the end of 1 second, so that relay D cannot be operated by relay E until the micro-switch 52 is again opened. Thus, when a correction is made, further correction cannot be made until the rubber layer 16 or 24 then being produced at the rolls, reaches the gauges G or G'. Thus, if the first correction is sufficient, no additional correction is necessary, while if additional correction is necessary, further correction again must wait until the effect thereof is determined through the gauges.

Energization of relay D not only causes control action to be initiated but also closes the normally open contacts D which are placed in a line 75 extending between line 47 and the initiating terminal of relay F, and closes the normally open contacts D connected in a line 76 between line 48 and the junction of parallel lines 77 and 78, the opposite junction of which is connected to wire 68. A lamp 79 and normally closed contacts A are in series in line 77, while a lamp 80 and normally closed contacts B are in series in line 78, so that when current flows through line 77, lamp 79 will be lit, indicating actual correction for light stock, and similarly when current flows through line 78, lamp 80 will be lit, indicating actual correction for heavy stock. It will be noted that when relay A is energized, contacts A in line 77 will be opened, so that lamp 80 will then be lit when the contacts D in series therewith close; similarly, when relay B is energized, contacts B in line 78 will be opened, so that lamp 79 will be lit when the contacts D in series therewith close.

Relay F is a protective relay, and is set for a suitable time delay, such as 12 seconds, so that if any of the relays stick or correction takes place for an undue length of time for any other reason, relay F at the end of its time period will open normally closed contacts F at wire 68, thereby causing relay E to reset and de-energize relay D by restoring contacts E in line 73 to open position. In addition, relay F will cause relay J to be energized by closing the normally open contacts F connected to line 47 and by a wire 81 to a line 82 in which relay J is placed and which is connected to line 48. Energization of relay J closes contacts J in a line 83, in which a horn 84 and a lamp 85 are placed in parallel, and which connects with line 82 beyond relay J, and also closes contacts J in a reset line 86 in which a reset switch 87 is placed. Flow of current through line 83 causes horn 84 to blow and lamp 85 to light, thus advising the operator of the event. The operator should then shift to manual control, and open reset switch 87 to reset relay J.

In the event that an unduly long call for correction is caused by a lack of rubber at the rolls, this will also be indicated by a lamp 88 in a line 89, extending between lines 47 and 48 and in which normally open contacts K are placed. Normally open contacts K are operable simultaneously with normally closed contacts K in line 62, by relay K, whenever the amplified voltage from gauges G or G' exceeds a predetermined value. This condition is usually due to a lack of rubber, and in addition to closing contacts K to light lamp 88, normally closed contacts K are also opened, to deactivate the entire control apparatus, as indicated previously. After the condition has been corrected, by supplying rubber once again to the rolls which are starved, the operator, who has opened switch 50 when apprised of the condition, will then be able to close switch 50 so that automatic operation can again ensue.

Figure 3:
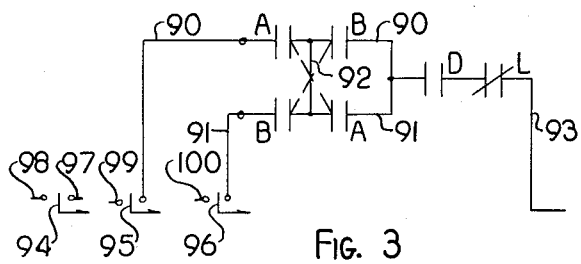
Fig. 3 is a circuit diagram illustrating certain electrical parts installed in an operator's control panel.

In addition to the control circuit of Fig. 2, the apparatus of this invention may also include a control circuit illustrated in Fig. 3, such as installed at an operator's control panel. In this circuit, four sets of contacts, i. e. a pair of contacts A and a pair of contacts B are electrically interlocked, one set of contacts A and one set of contacts B being disposed in each of leads 90 and 91, respectively, but on opposite sides of a crossing wire 92. The leads 90 and 91 are connected to a "hot wire" lead 93, which is connected to a suitable source of control current, such as 230 volts, A. C. A pair of contacts D, which are closed when relay D of Fig. 2 is energized, and also a pair of contacts L, which may be controlled by a speed responsive switch L, are also connected in lead 93. Speed responsive switch L may be a conventional magnetic switch responsive to the speed of the shaft for roll 13, for instance, so as to close contacts L only if the speed of the fabric is sufficient, such as about 8 yds. per minute, to warrant automatic operation. However, as long as the speed exceeds this minimum speed, contacts C will be closed, and therefore are shown as normally closed in Fig. 3.

A three-way switch has blades 94, 95 and 96, respectively, which are adapted to be moved simultaneously between the left and right positions indicated. The blade 94 is connected to the low speed control, magnetic switch coil of the screw-down motor for the upper roll 14 or 23; the blade 95 is connected to the magnetic switch coil for starting the screw-down motor in the down direction; and the blade 96 is similarly connected to the magnetic switch coil for the screw-down motor which initiates the motor in the up direction. When the blades 94, 95 and 96 are moved into engagement with the right hand blade contacts of Fig. 3, the switch blade 95 is thus connected with the lead 90 and the blade 96 with the lead 91, while the blade 94 engages a contact 97 through which suitable current is supplied to activate the magnetic switch coil to limit the screw-down motor to low speed position. When the switch blades 94, 95 and 96 are moved to the left, they will engage contacts 98, 99 and 100, which are connected in a suitable manual control circuit, which may be conventional and therefore is not shown.

As will be evident, with contacts L normally closed, when contacts D in lead 93 close, the adjustment motor for the upper roll will begin to operate in either the up or down direction, depending upon whether relay A or relay B of Fig. 1 has been energized. As will further be evident, when contacts A in leads 90 and 91 are closed, current will flow from lead 93 to a portion of lead 91 and the closed contacts A, then through cross wire 92 and the other set of closed contacts A and lead 90 to switch blade 95, thereby initiating adjustment in the down direction. Similarly, when contacts B of Fig. 2 are closed, current will flow from lead 93 to a portion of lead 90 and the closed contacts B therein, then through cross wire 92 to the other closed contacts B and lead 91 to switch blade 96, thereby causing the adjustment motor to initiate adjustment action in the up direction. Whenever relay D is de-energized, as through action of relay C of Fig. 2, the contacts D in lead 93 will open, thereby stopping control action, in either the up or down direction, previously initiated.

In the illustrative chart records shown in Figs. 4, 5 and 6, as before the center line 43 indicates the desired weight of material per square yard, while lines 44 and 45 indicate the light and heavy tolerances, respectively. The charts of Figs. 4, 5 and 6 were moving in the direction of the arrows 105, and the upper ends of the lines were made first, and the lower ends made last. The heavier line indicates the line made by one pen responsive to the thickness at one side of the strip, while the lighter line indicates the line made by the other pen, responsive to the thickness at the opposite side of the strip. It will be understood, of course, that the pens do not ordinarily make heavier and lighter lines, but rather are provided with ink of different colors, such as red and blue, red and green, or any other readily distinguished combination. At the upper end of Fig. 4, it will be noted that one side (represented by the light line) was within limits and the other side (represented by the heavy line) was light. As soon as both sides went off limits, it was necessary to make a correction, which resulted in the correction swing 106, but the operator's reaction time was such that some time, comparatively speaking, had elapsed before the correction could be made. In addition, an overcorrection was made, since immediately below, both lines had swung to the right past the heavy tolerance limit. While the condition was ultimately corrected, considerable material was outside specification. It will be understood that the difference in vertical distance between the lines 106 is due to the fact that one pen is ahead of the other, and the chart should be read with this fact in mind, since the record actually indicates that the swings occurred simultaneously. The vertical line 107 indicates that the gauge head controlling that pen was retracted for calibration, and during the time of calibration, of course, the operator did not know whether any correction was necessary.

In Fig. 5, slight corrections were made at each of the points 108, 109, 110 and 111, in reverse order. While the material at each side of the strip was quite close to the desired specification, and the approximate center of the swings of the two lines follow closely within specification, more than momentary swings of the lines produced a correction. As will be evident, very little material was outside specification, and none seriously, while both lines were soon returned to positions well within the tolerance limits, as will be evident from the lower portion of Fig. 5.

In Fig. 6, the lines follow closely the desired unit weight line 43, with slight swings to left and right, the vertical line 107 indicating a retraction of one of the heads, and a correction being made immediately below line 107. A comparison of this correction, with the length of time required and the overcorrection with manual control, as in Fig. 4, indicates clearly the value of automatic control by the apparatus of this invention.

From the foregoing, it will be evident that the control apparatus of this invention fulfills to a marked degree the requirements and objects hereinbefore set forth. Delaying correction for a predetermined time period, enables any difference in thickness of the layer of rubber or the like due to a correction adjustment to reach the gauges before further correction is made. Also, such delay is preferably inversely proportional to the speed of travel of the strip, thus permitting corrections to be made at the earliest possible moment consonant with conditions. Such time delays also permit correction to be more effective, and permit automatic control to be utilized with a minimum of material outside specification limits. As will further be evident, the apparatus is reliable in operation, yet provides sufficient warning and requires manual operation when the same is necessary. While such apparatus is particularly adapted to utilize beta ray gauges, it may be utilized with other types of gauges, such as magnetic or physical measuring heads, as when the speed is not excessive, or other types of rays or the like.

Although a specific embodiment of this invention has been described in detail, it will be understood that this embodiment is illustrative, and that other embodiments may exist and various changes made therein, all without departing from the spirit and scope of this invention.

What is claimed is:
1. Apparatus for controlling the production of at least one layer of material to form a strip, through the passage of material between substantially parallel rolls provided with means for adjustment of at least one roll toward and away from the other to control the thickness of the layer produced, such apparatus comprising means for directing beta rays or the like through said strip; means responsive to the proportion of rays passing through said strip; means controlled by said responsive means for producing a signal resulting from a change in the rays reaching said responsive means and indicating a change in thickness of said strip to a thickness greater than a first predetermined thickness and another signal indicating a thickness less than a second and lesser predetermined thickness; means for actuating said adjustment means for adjusting said rolls to a position closer together in response to a signal indicating a thickness of said strip greater than said first predetermined thickness; means for actuating said adjustment means for adjusting said rolls to a position further apart in response to a signal indicating a thickness of said strip less than said second predetermined thickness; and means for delaying subsequent action of each said actuating means for a period of time inversely proportional to the speed of said strip and thereby corresponding to the time required for said strip to move from said rolls to said ray directing and ray responsive means, said delay means including a time delay relay, a switch controlling said relay, and means for opening said switch periodically and at time periods inversely proportional to the speed of said strip.

2. Apparatus for controlling the production of at least one layer of material to form a strip, through the passage of material between substantially parallel rolls provided with means for adjustment of at least one roll toward and away from the other to control the thickness of the layer produced, such apparatus comprising means responsive to the thickness of said strip; means controlled by said responsive means and including a relay for producing a signal indicating a change in thickness of said strip to a thickness greater than a first predetermined thickness, and a second relay for producing a signal indicating a thickness less than a second and lesser predetermined thickness; first means for actuating said adjustment means for adjusting said rolls to a position closer together; second means for actuating said adjustment means for adjusting said rolls to a position further apart; a first time delay relay actuated by said first or said second relay; a second time delay relay actuated by said first or said second relay and also controlled by a normally closed switch; means operated in synchronism with the speed of said strip for periodically opening said normally closed switch; a third time delay relay for terminating operation of said first and second adjustment actuating means at the end of a predetermined time, said third time delay relay being actuated through said first time delay relay; and electrical means for controlling said first and second actuating means when said first time delay relay reaches the end of its period, said electrical means initiating said first actuating means when said first relay is energized and initiating said second actuating means when said second relay is energized, said second time delay relay terminating operation of each said actuating means at the end of its time period.

References Cited in the file of this patent
UNITED STATES PATENTS

| | | |
|---|---|---|
| 2,264,725 | Shoupp et al. | Dec. 2, 1941 |
| 2,565,734 | Lundahl | Apr. 28, 1951 |
| 2,653,247 | Lundahl | Sept. 22, 1953 |

OTHER REFERENCES

Beta-Ray Thickness Gage for Sheet Steel, by Otto Smith, from Electronics, October 1947, pp. 106–112.